Figure 3:
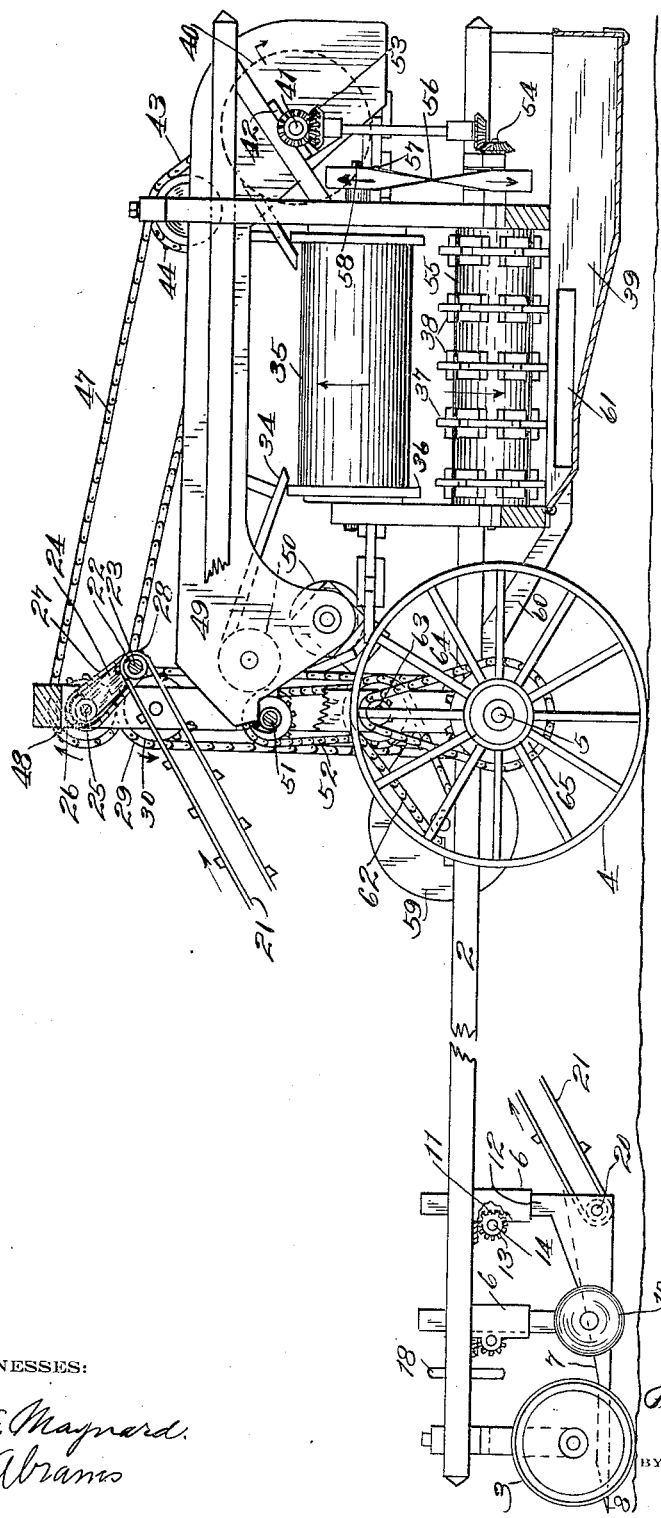

F. G. CAMPODONICO.
POTATO CLEANING APPARATUS.
APPLICATION FILED FEB. 21, 1914.
1,125,898.
Patented Jan. 19, 1915.
2 SHEETS—SHEET 1.
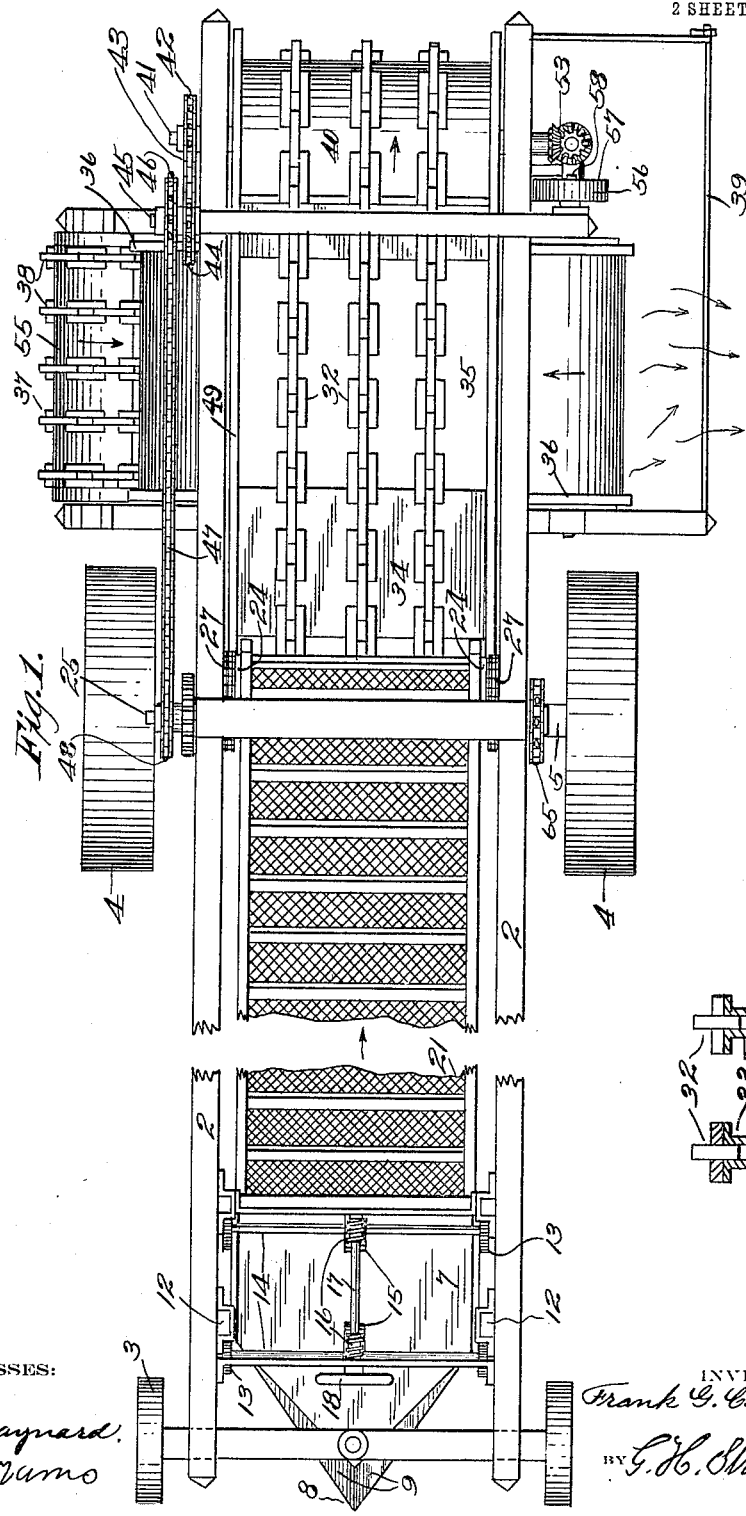
WITNESSES:
F.E. Maynard
B. Abramo
INVENTOR
Frank G. Campodonico
BY G.H. Strong
ATTORNEY

F. G. CAMPODONICO.
POTATO CLEANING APPARATUS.
APPLICATION FILED FEB. 21, 1914.

1,125,898.

Patented Jan. 19, 1915.
2 SHEETS—SHEET 2.

WITNESSES:
F. E. Maynard.
B. Abrams.

INVENTOR
Frank G. Campodonico
BY G. H. Strong.
ATTORNEY

UNITED STATES PATENT OFFICE.

FRANK G. CAMPODONICO, OF STOCKTON, CALIFORNIA.

POTATO-CLEANING APPARATUS.

1,125,898.                Specification of Letters Patent.       Patented Jan. 19, 1915.

Application filed February 21, 1914. Serial No. 820,341.

*To all whom it may concern:*

Be it known that I, FRANK G. CAMPODONICO, a citizen of the United States, residing at Stockton, in the county of San Joaquin and State of California, have invented new and useful Improvements in Potato-Cleaning Apparatus, of which the following is a specification.

This invention relates to a suitably propelled vehicle for digging potatoes or other vegetables and for segregating the potatoes from the soil and vines.

It is an object of the present invention to provide a machine for efficaciously digging the potatoes, a means being provided which is adjustable to a depth to dig below the surface at a depth most efficient for the gathering of the potatoes; means also being provided for conveying the potatoes from the digging device to a suitable oscillating screen conveyer by which the larger clods of soil and the vines are separated from the potatoes and conveyed away and separately discharged, the potatoes and similar earth clods and dirt being delivered to the second conveyer, which in turn conveys the potatoes and such of the earth material as passes through the first screen to a second screen by which the potatoes are effectively separated from the residue of earth and debris.

It is a further object of the invention to provide means for subjecting the potatoes, as they pass from the final screen or segregating apparatus to a blast of air, so that lighter adhering dust and earth particles may be effectually removed, the potatoes ultimately being gathered in a suitable basket or collector by which they may be discharged in suitable quantities and at desired intervals.

The invention consists in the construction, the combination and in details of construction as will be more fully described in the following specification and shown in the accompanying drawings in which—

Figure 1 is a plan view of the apparatus. Fig. 2 is a detail sectional view of a fragment of a separator screen with its supporting rails. Fig. 3 is a side elevation partly broken away.

The present potato digging apparatus is shown as embodied in a vehicle having a suitable frame with longitudinal sill members 2 supported at its forward end upon suitable steering wheels 3, and provided intermediate of its length with traction wheels 4, secured on an appropriate axle structure 5 from which is derived power during the progress of the vehicle to operate the several mechanisms of the apparatus. Vertically adjustable, in suitably fixed guides 6, on the front portion of the machine and below the frame 2 there is provided a rigid gathering shield or shovel device 7 which has a forwardly projecting point 8 the front divergent edges 9 of which are beveled downwardly toward the bottom of the point 8, the shield or shovel being adapted to enter the soil and be adjusted at a sufficient depth below the soil surface for the efficient gathering without mutilation of the vegetables to be harvested. On opposite sides of the shovel 7 are provided disk cutters 10 for the setting and guiding of the shovel while cutting under-ground. Any suitable means may be provided for effecting a vertical adjustment of the shovel so as to dig to the proper depth, and as here shown, this means comprises racks 11, formed upon or attached to uprights 12 of the shovel structure, and which are supported in the guides 6, pinions 13 engaging racks 11 and being secured upon suitably actuated shafts 14 which may be provided with suitable gears 15, these being meshed with screws or worms 16 upon a common shaft 17 which is actuated by a hand-wheel 18 when it is desired to raise or lower the shovel 7.

Suitably journaled in the rear portion of the upwardly inclined shovel 7 is a roller or shaft 20, around which runs a draper or conveyer belt 21 upon which the earth and potatoes gathered by the shovel 7 are discharged over the rear end of the latter and conveyed upwardly, discharging over the head drum or cylinder 22 on the transverse shaft 23. The shaft 23 is journaled in the lower ends of oscillating hangers or links 24, pivoted upon a cross-shaft 25 in the upright portion of the frame 2.

Power is transmitted to the head drum 22 by sprockets 26 fast on the shaft 25 and which engage sprocket chains 27 running to and operating sprocket wheels 28, secured on the transverse drum shaft 23. Power to drive the head shaft 25 is derived from a sprocket chain 29 engaging a sprocket wheel 30 geared to the head shaft 25, and which extends downwardly on one side of the frame 2, and engages a sprocket wheel on the contiguous end of the axle 5, which latter derives power from its traction wheel 4.

When the vehicle is propelled and the potatoes and soil conveyed upwardly by the draper 21, they are discharged over the head cylinder 22 onto a suitable type of traveling screen, which is here shown as consisting of a horizontally disposed and traveling chain screen 32, the chains of which are here shown as of flat links, suitably proportioned, and preferably spaced apart to allow the free passage of the potatoes and such clumps of soil as are not too large to pass through the spaces between the edges of the spaced chains 32 of the screen which chains 32 are laterally spaced in parallel relation, and supported upon fixed rails 33, as shown in Fig. 2, the lateral pitch or spacing of the rails 33 being provided to allow for the passage of the potatoes and soil when not too large to pass therethrough.

Beneath the uppermost stretch of the endless chain screen 32 there is arranged an inclined chute 34 onto which the potatoes and material coming through and over the screen are discharged, and thence deposited on the transversely extending endless transfer belt 35, running over drums 36, mounted in a suitable bearing on the opposite sides of the frame 2, and which transfer belt 35 carries the potatoes and other material deposited thereon on its upper surface transversely crossing the vehicle and discharges the same at one end onto the upper stretch of an oppositely traveling screen 37, which consists of a plurality of laterally spaced transversely running chains 38, and which operates beneath the lower stretch of the transfer belt 35, and discharges potatoes separated from the earthy element and debris while the screen 37 is transversing the frame, ultimately discharging the potatoes into a basket or collecting box 39, from which they may be collected or dumped as necessary, or at suitable intervals.

The uppermost primary chain screen 32 travels around a rearmost master-drum or cylinder 40, which is secured upon a driving shaft 41 which is journaled in suitable bearings 42 on the rear upper structure of the frame 2, there being secured on the shaft 41 a driving sprocket 42', Fig. 1, driven by a sprocket-chain 43, engaging another sprocket 44, on an intermediate or counter-shaft 45, to which is secured also another sprocket 46, deriving power from a transmission chain 47 running forwardly on one side of the machine, and engaging a driving sprocket 48 on the head shaft 25 which, as before described, derives its power from the driving axle 5 through means of a transmission sprocket chain 30.

In order to facilitate the separation of the earth lumps and particles from the potatoes, it is desirable that the primary screen device 32 be given an oscillatory or vibrating motion, and to that end there is mounted upon the pivot shaft 41 of the screen 32 an oscillating frame, consisting of side boards 49, which extend forwardly inside of the super-structure of the frame 2 and support the upper and lower idle drums 50, around which the chains or screen 32 travel. A suitable device, comprising a cam shaft 51, mounted in the super-structure of the frame 2, and being driven by a suitable sprocket mechanism 52, engages and operates a contiguous portion of the side boards 49 of the oscillating frame of the upper screen so that a shaking movement is imparted to the latter for accelerating the separation of the smaller from the larger masses which are conveyed upwardly by the draper 21 and discharged on the upper screen 32.

From the pivot shaft 41 which drives the screen chains 32, power may be transmitted by suitable gearing 53 to a shaft 54, on which is a drum 55, supporting and driving the secondary screen 37 onto the uppermost strands of which the potatoes and unsegregated debris are deposited by the transfer belt 35, motion being transmitted to the latter through a suitable means shown as a belt 56, driving a pulley 57 on the shaft 58, upon which one of the drums 36 of the transfer belt is secured.

An important feature of the present invention is to remove the dirt as fully as possible in a simple and convenient manner with apparatus capable of being carried and operated by the vehicle, and to that end I have provided a blower 59 connected to a flue 60 which is adapted to discharge a blast of air through a mouth 61 which is so disposed with relation to the discharge end of the secondary screen 37 and the basket or box 39, as to blow away as much as possible of the dirt and dust adhering to and traveling with the potatoes as they are finally segregated by the second screen. Any suitable power transmitting means may be utilized for operating the blower 59, and such is here shown as comprising a suitable chain and sprocket gearing 62, deriving power from an intermediate shaft 63, which is driven by a chain 64 from a driving sprocket 65 on the contiguous axle portion 5 of a traction wheel, the shaft 63 also being utilized for transmitting power to the cam shaft 51 of the oscillating device.

I claim:

1. In a potato cleaning apparatus, a longitudinal screen, a transverse conveyer below the screen, a transverse screen below the conveyer for receiving material from one end thereof, and means to drive the conveyer and transverse screen in opposite directions.

2. In a potato cleaning apparatus, a frame, a longitudinal upwardly inclined conveyer to receive material, a longitudinal traveling endless screen arranged below the upper end of the conveyer to receive material from the latter, a transverse traveling transfer belt below said screen, a transverse traveling screen below the belt, arranged to receive material from one end of the upper stretch of the belt, and means to drive the transverse screen and belt in opposite directions.

3. In a potato cleaning apparatus, a frame, a longitudinal upwardly inclined conveyer to receive material, a longitudinal traveling endless screen arranged below the upper end of the conveyer to receive material from the latter, a transverse traveling transfer belt below said screen, an inclined chute beneath the upper stretch of the screen having a discharge end which overlies one side of the transfer belt, a transverse traveling screen below the belt arranged to receive material from one end of the upper stretch of the belt, and means to drive the transverse screen and belt in opposite directions.

4. In a potato cleaning apparatus, a main frame, an upwardly traveling conveyer to receive material, a frame pivoted to the main frame, an endless traveling screen borne by said pivoted frame and arranged to underlie the discharge end of the conveyer, means to oscillate the pivoted frame, a transverse transfer belt disposed below said screen, a transverse screen below said transfer belt, and means to operate the transverse belt and screen in opposite directions.

In testimony whereof I have hereunto set my hand in the presence of two subscribing witnesses.

FRANK G. CAMPODONICO.

Witnesses:
FRANCIS CUTTING,
L. MILTON CUTTING.

Copies of this patent may be obtained for five cents each, by addressing the "Commissioner of Patents, Washington, D. C."